United States Patent
McBride et al.

(10) Patent No.: US 10,544,830 B1
(45) Date of Patent: Jan. 28, 2020

(54) INVERTIBLE COUPLER RING FOR RAILWAY AXLE BEARING ASSEMBLIES

(71) Applicant: Aktiebolaget SKF, Gothenburg (SE)

(72) Inventors: Tadd McBride, Riverton, UT (US); Josh Anderson, Stansbury Park, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/172,513

(22) Filed: Oct. 26, 2018

(51) Int. Cl.
  *F16C 33/60* (2006.01)
  *F16C 19/38* (2006.01)
  *F16C 33/46* (2006.01)

(52) U.S. Cl.
  CPC ........ *F16C 19/386* (2013.01); *F16C 33/4605* (2013.01); *F16C 2326/10* (2013.01)

(58) Field of Classification Search
  CPC .............................. F16C 19/386; F16C 33/60
  See application file for complete search history.

(56) References Cited

U.S. PATENT DOCUMENTS

| | | | | |
|---|---|---|---|---|
| 4,783,182 A | * | 11/1988 | Caron | F16O 19/183 384/504 |
| 5,096,310 A | * | 3/1992 | Meining | F16C 19/28 384/506 |
| 5,121,998 A | * | 6/1992 | Bhatia | F16C 19/386 384/448 |
| 5,641,239 A | * | 6/1997 | Michalek | F16O 33/60 384/499 |

* cited by examiner

*Primary Examiner* — Phillip A Johnson

(57) ABSTRACT

A coupler is for selectively coupling a first bearing ring with a first backing ring or a second bearing ring with a second backing ring and includes a flexible annular body disposeable simultaneously within the first bearing ring and first backing ring or within the second bearing ring and second backing ring. A first bearing projection and a first backing ring projection extend radially from a first circumferential surface and are axially spaced apart and a second bearing projection and a second backing ring projection extend radially from a second circumferential surface and are axially spaced apart. The body is invertible between a first orientation in which the first bearing ring and backing ring projections are disposeable within the first bearing and backing ring openings and a second orientation in which the second bearing ring and backing ring projections are disposeable within the second bearing and backing ring openings.

9 Claims, 18 Drawing Sheets

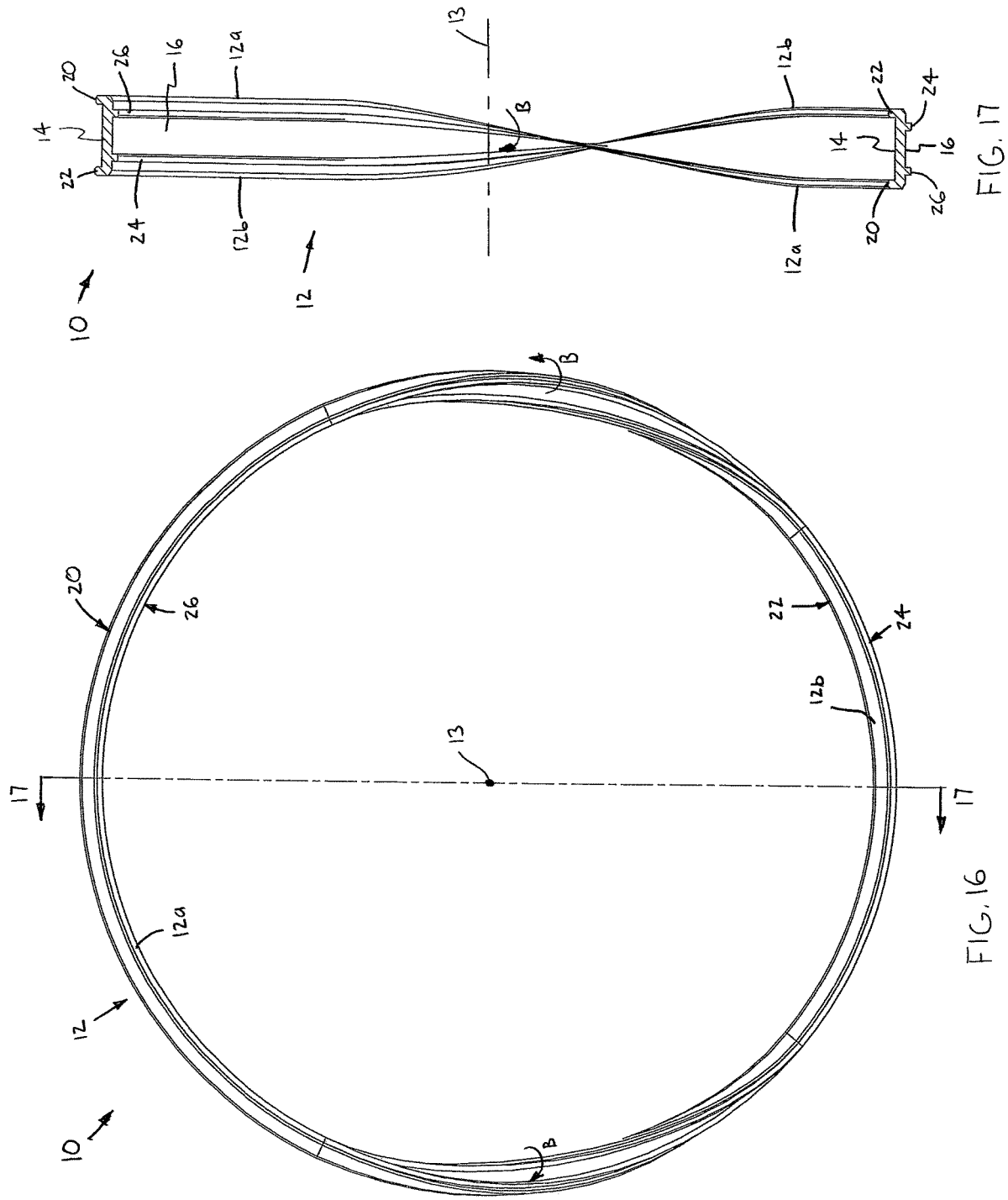

INVERTIBLE COUPLER RING FOR RAILWAY AXLE BEARING ASSEMBLIES

BACKGROUND OF THE INVENTION

The present invention relates to railway axle assemblies, and more particularly to clips for retaining a backing ring with a bearing inner ring.

Railway axle assemblies typically include an axle or shaft, upon which is mounted two wheels, and a bearing assembly for coupling the shaft with a bogie frame. The bearing assembly includes one or more bearings for rotatably supporting the shaft and is typically mounted on a diametrically smaller end portion of the shaft, the wheels being mounted on a diametrically larger central portion. As such, the axle bearing assemblies generally include a backing ring for axially positioning the bearing assembly in relation to a fillet joining the larger shaft section with the smaller shaft section. During installation of the axle bearing assembly onto the shaft, it is preferable to have some means for at least temporarily coupling the backing ring with an adjacent end portion of the bearing.

SUMMARY OF THE INVENTION

In one aspect, the present invention is a coupler for selectively coupling either a first bearing ring with a first backing ring or a second bearing ring with a second backing ring. Each one of the bearing rings and each one of the backing rings have at least one opening on an inner circumferential surface. The coupler comprises an annular body formed of a flexible material, sized to be disposeable simultaneously within the first bearing ring and the first backing ring or within the second bearing ring and the second backing ring, and having a centerline, first and second axial ends and opposing first and second circumferential surfaces. A first bearing projection and a first backing ring projection each extend radially from the body first circumferential surface and are spaced apart axially along the centerline. A second bearing projection and a second backing ring projection each extend radially from the body second circumferential surface and are spaced apart along the centerline. Further, the annular body is configured to be invertible between a first orientation and a second orientation. In the first orientation, the first circumferential surface is an outer circumferential surface, the first bearing ring projection is disposeable within the first bearing opening and the first backing ring projection is disposeable within the first backing ring opening so as to couple the first bearing ring and the first backing ring. In the second orientation, the second circumferential surface is an outer circumferential surface, the second bearing ring projection is disposeable within the second bearing opening and the second backing ring projection is disposeable within the second backing ring opening so as to couple the second bearing ring and the second backing ring.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 16 is a side view of the coupler during the inverting process;

FIG. 17 is a view through line 17-17 of FIG. 16;

FIG. 18, are each an enlarged, broken-away axial cross-sectional view of the coupler, each depicting a separate variation of the coupler structure.

DETAILED DESCRIPTION OF THE INVENTION

Figure 1:
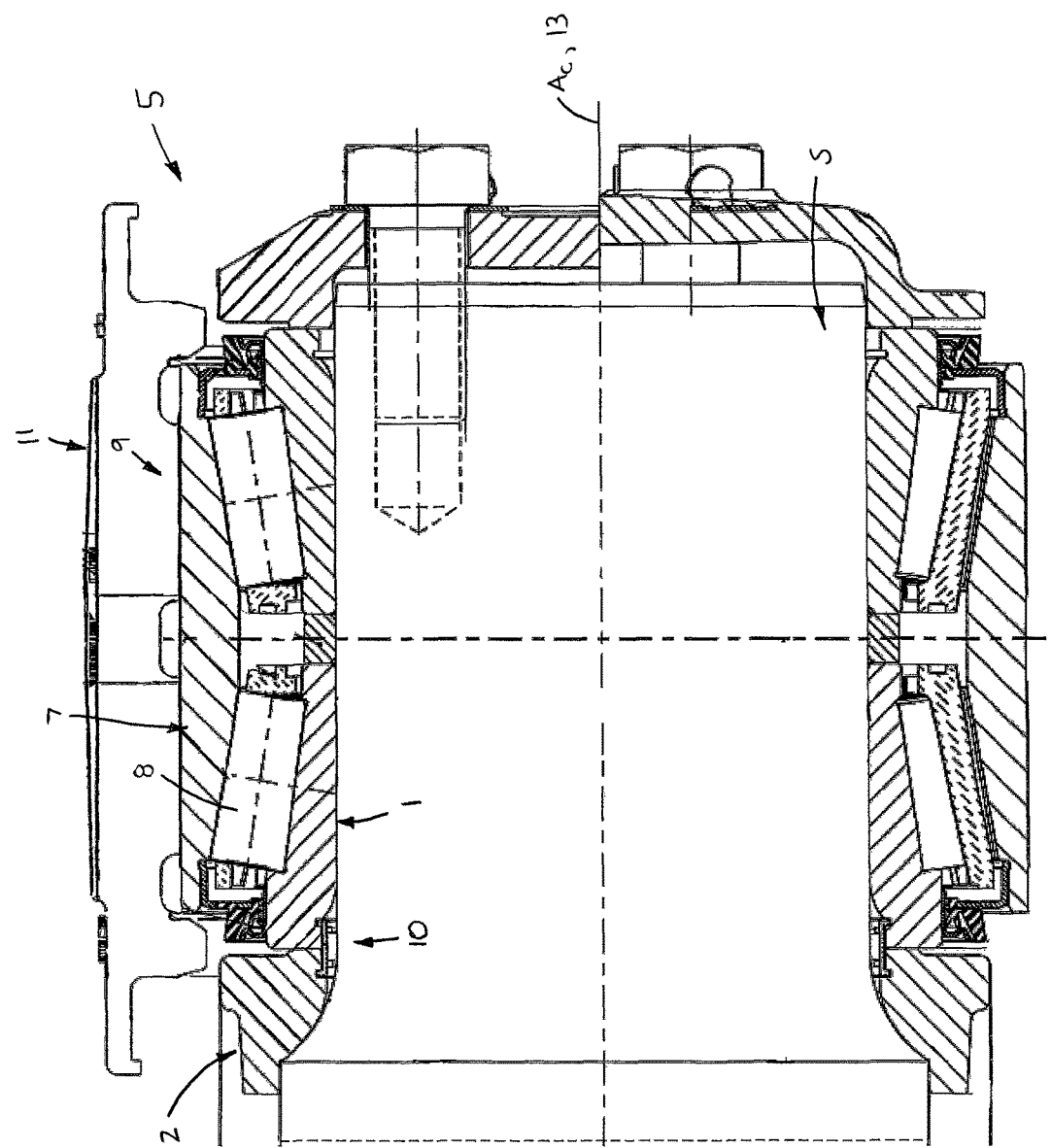
FIG. 1 is an axial cross-sectional view of a first railway axle assembly including a coupler in accordance with the present invention.
Figure 2:
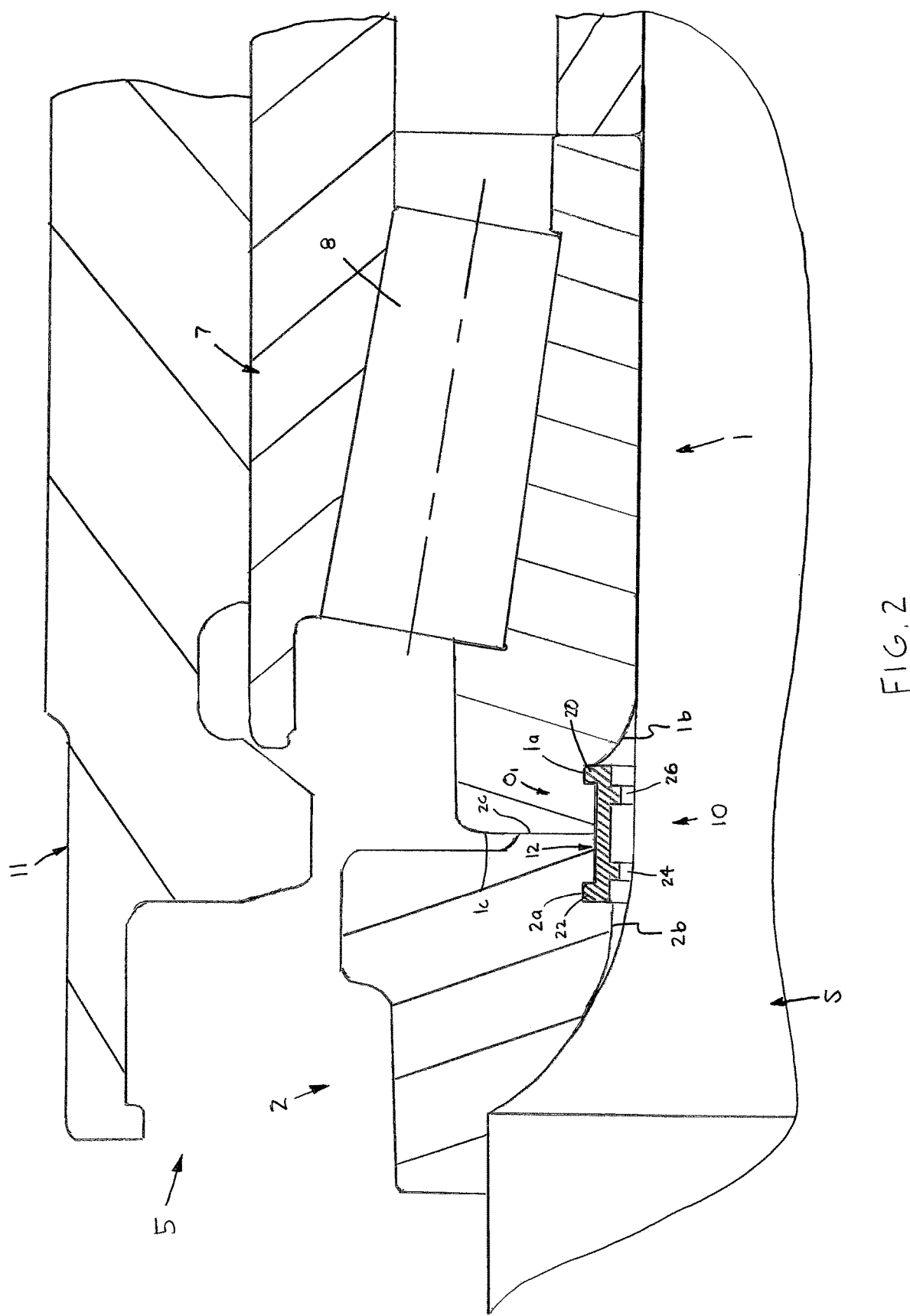
FIG. 2 is a broken-away, enlarged view of a portion of FIG. 1.
Figure 3:
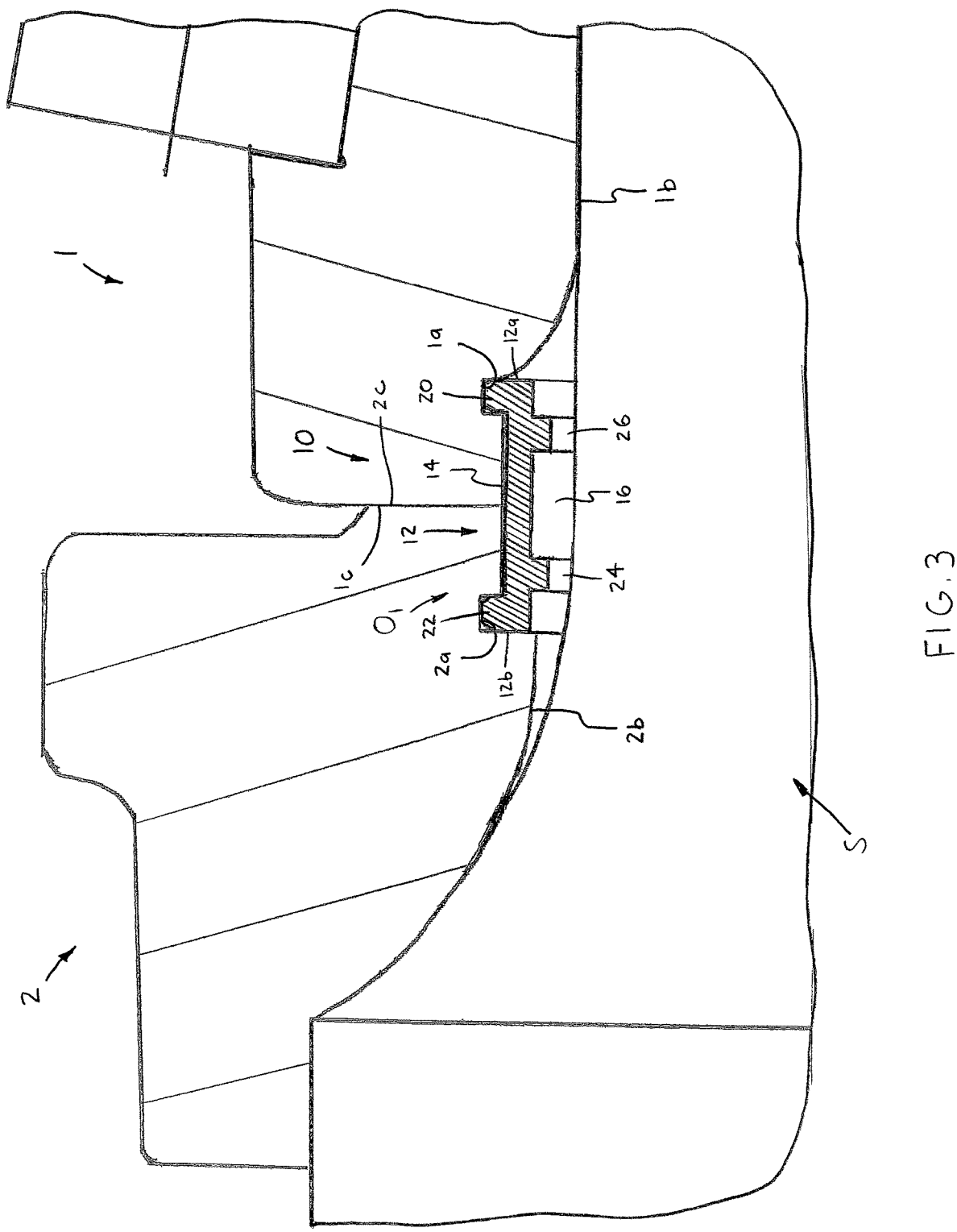
FIG. 3 is a broken-away, more enlarged view of the portion of FIG. 2, showing the coupler in the first orientation.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-19 a coupler 10 for selectively coupling either a first bearing inner ring 1 with a first backing ring 2 in a first construction railway axle bearing assembly 5, or a second bearing inner ring 3 with a second backing ring 4 in a second construction railway axle bearing assembly 6. Each axle bearing assembly 5, 6 is mountable onto a shaft or axle S rotatable about a central axis Ac and further includes a bearing outer ring 7 disposed about the inner ring 1 or 3 and a plurality of rolling elements 8 disposed between the inner ring 1 or 3 and the outer ring 7. Preferably, each axle bearing assembly 5, 6 also includes a second bearing 9 (most preferably with a common outer ring 7) and an adapter or housing 11 for connecting the bearing assembly 5 or 6 with a bogie side frame (not shown).

Further, each one of the bearing rings 1, 3 has at least one opening 1a, 3a, respectively, formed on an inner circumferential surface 1b, 3b, respectively. Similarly, each one of the backing rings 2, 4 has at least one opening 2a, 4a, respectively, formed on an inner circumferential surface 2b, 4b respectively. Preferably, each opening 1a, 2a, 3a, 4a is formed as a continuous annular groove extending circumferentially and radially outwardly from the respective inner surface 1b, 2b, 3b, 4b, but may alternatively be formed as one or more separate, circumferentially-spaced generally arcuate grooves (not depicted).

Figure 4:
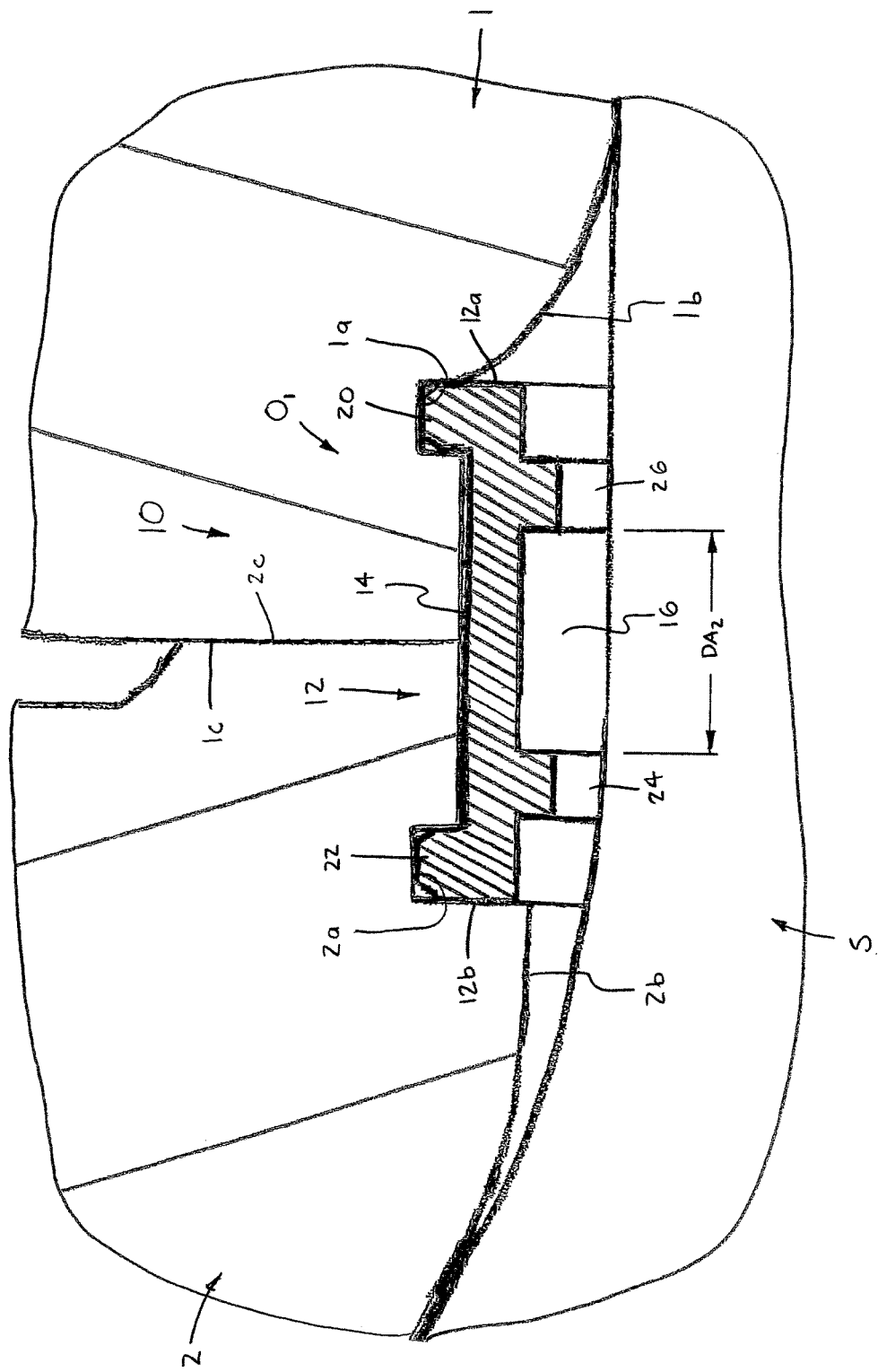
FIG. 4 is a more enlarged view of a portion of FIG. 3.
Figure 5:
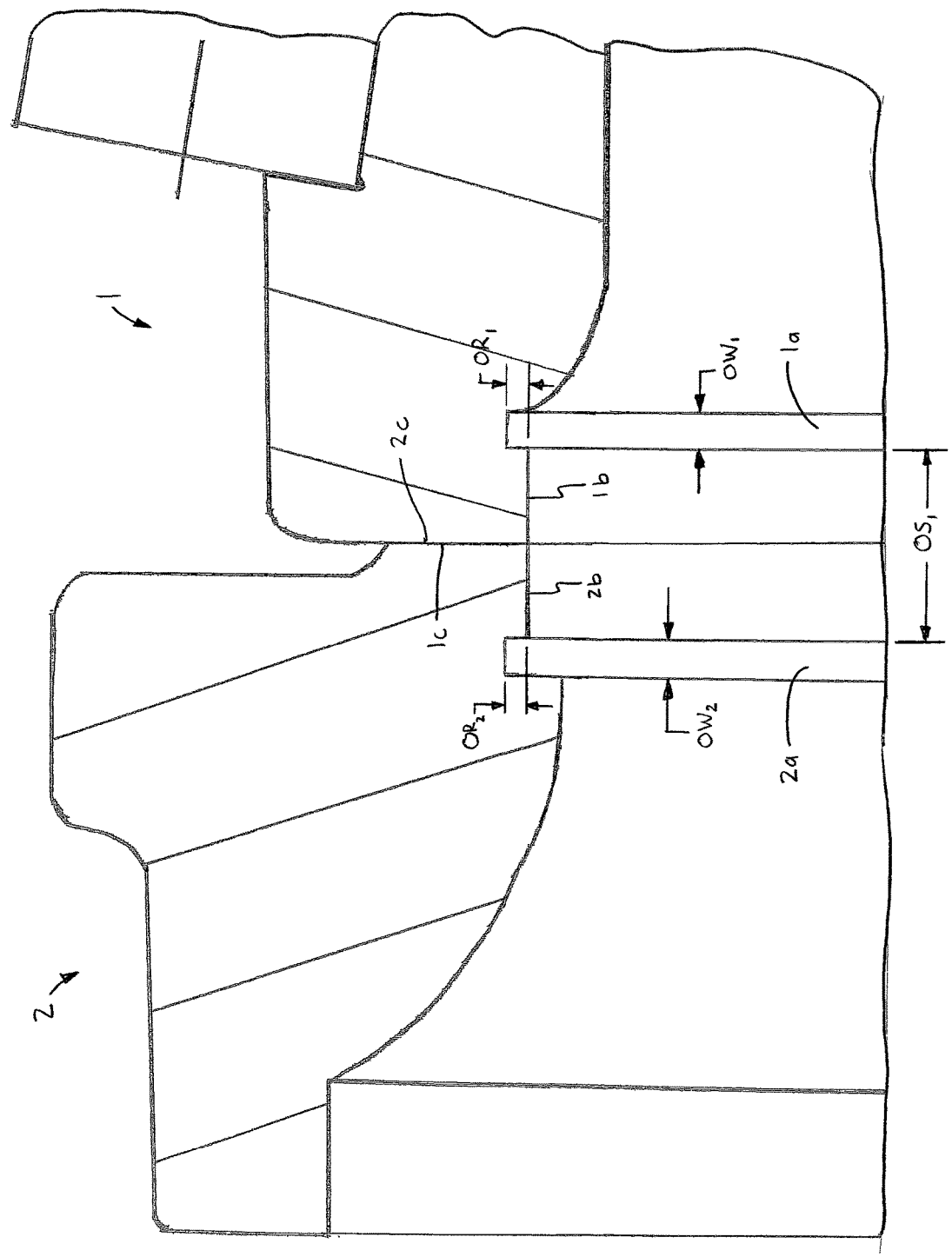
FIG. 5 is a broken-away, axial cross-sectional view of a bearing inner ring and a backing ring of the first axle assembly.
Figure 6:
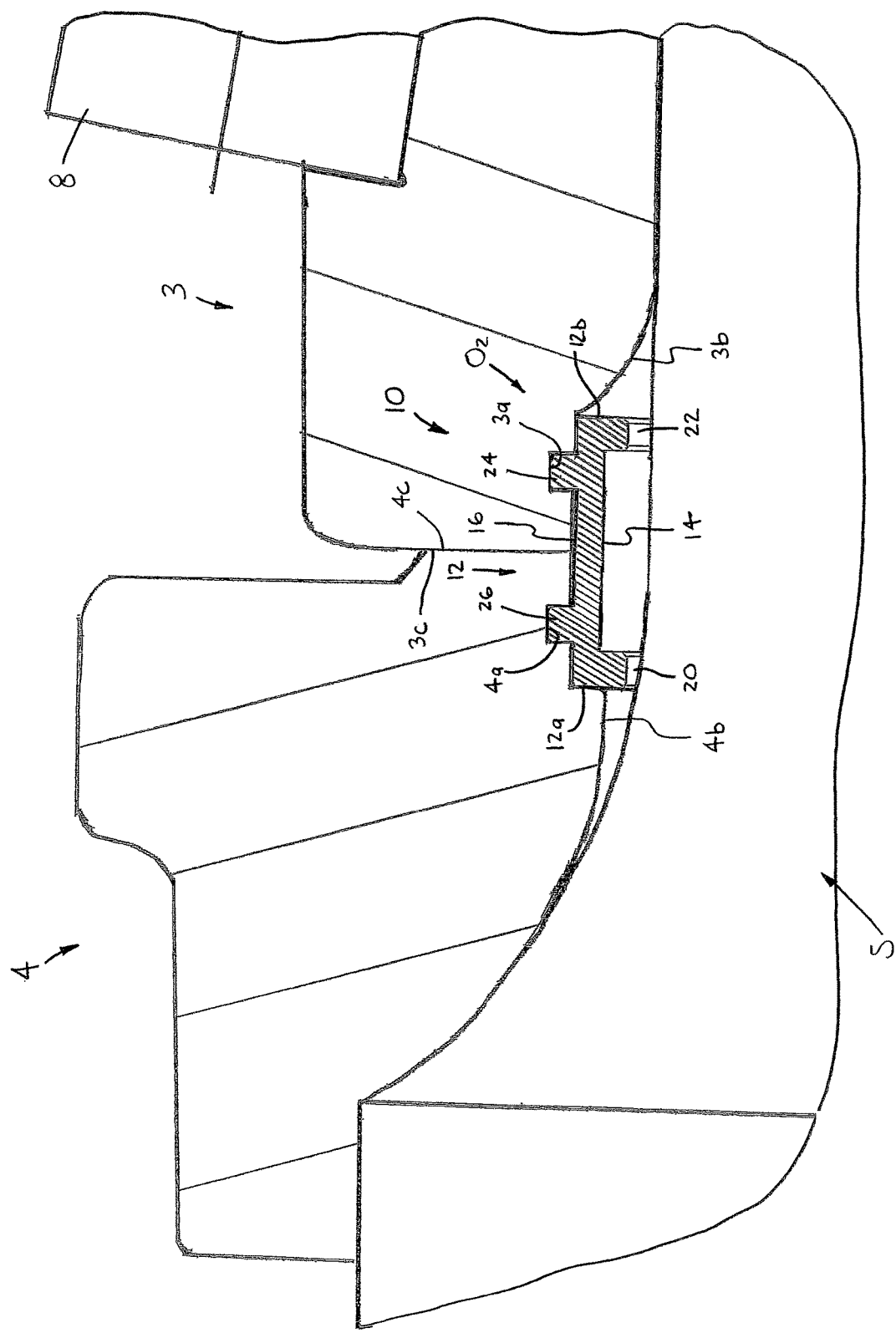
FIG. 6 is a broken-away, axial cross-sectional view of a second railway axle assembly, showing the coupler in a second orientation.
Figure 7:
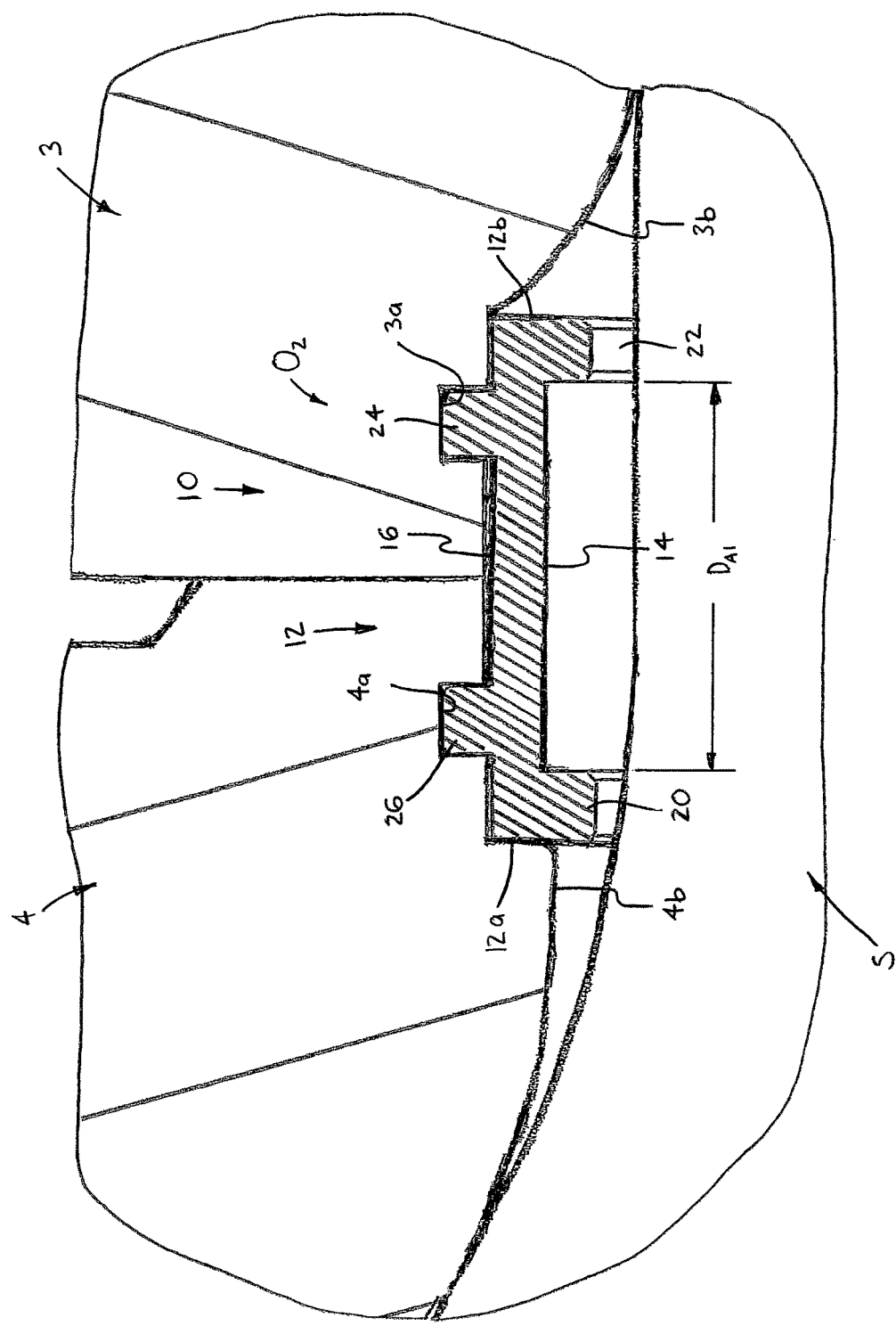
FIG. 7 is a broken-away, enlarged view of a portion of FIG. 6.
Figure 8:
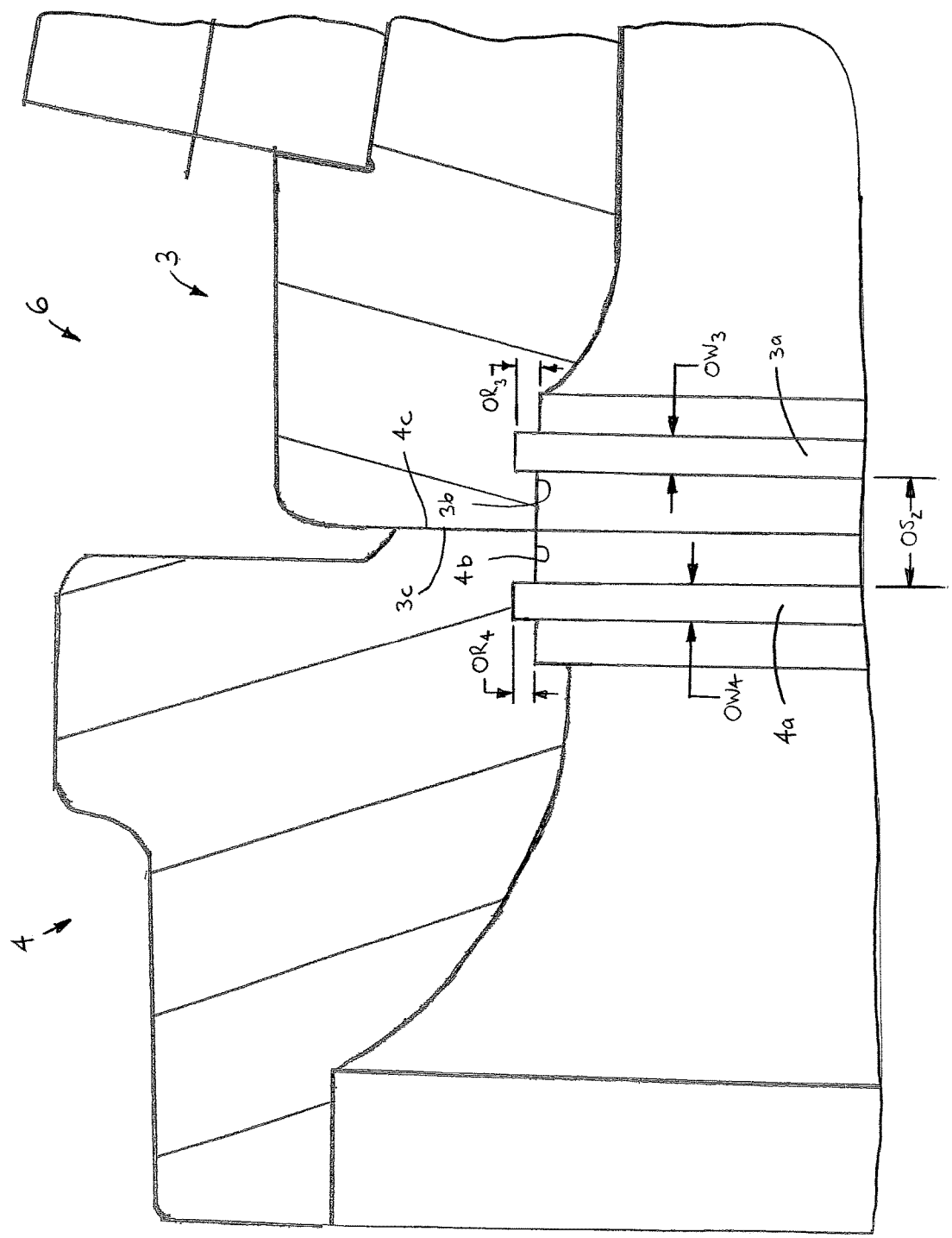
FIG. 8 is a broken-away, axial cross-sectional view of a bearing inner ring and a backing ring of the second axle assembly.
Figure 9:
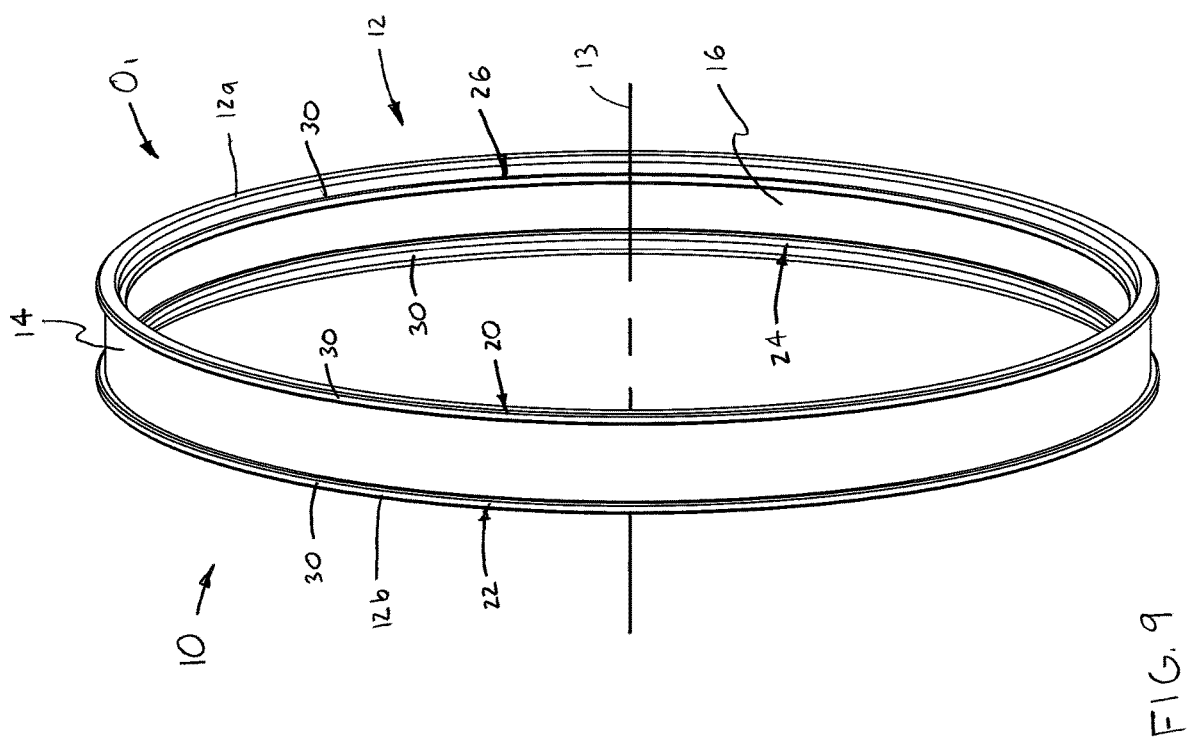
FIG. 9 is a perspective view of the coupler in the first orientation.

Basically, the coupler 10 comprises an annular body 12, a first bearing projection 20, a first backing ring projection 22, a second bearing projection 24 and a second backing ring projection 26. The coupler annular body 12 is formed of a flexible material and is sized (i.e., diametrically and axially) to be disposeable simultaneously within the first bearing ring 1 and the first backing ring 2 (FIGS. 1-4) or within the second bearing ring 3 and the second backing ring 4 (FIGS. 6 and 7). The annular body 12 has a centerline 13, first and second axial ends 12a, 12b, respectively, and opposing first and second circumferential surfaces 14, 16, respectively. The first bearing projection 20 and the first backing ring projection 22 each extend radially from the body first circumferential surface 14 and are spaced apart along the centerline 13 by a first axial distance $D_{A1}$ (FIGS. 7 and 11). Further, the second bearing projection 24 and the second backing ring projection 26 each extend radially from the body second circumferential surface 16 and are spaced apart along the centerline 13 by a second axial distance $D_{A2}$ (FIGS. 4 and 14). The coupler annular body 12 is configured to be invertible between a first orientation $O_1$, as shown in FIGS. 1-4 and 9-11, to connect the first inner bearing ring 1 and the first backing ring 2 and a second orientation $O_2$, as depicted in FIGS. 6, 7 and 12-14, to connect the second bearing ring 3 and the second backing ring 4. The coupler 10 basically functions to retain each backing ring 2 or 4 coupled with each bearing inner ring 1, 3, respectively, during assembly of the particular bearing assembly 5, 6 onto the shaft S.

More specifically, in the first orientation $O_1$, the first circumferential surface 14 is an outer circumferential surface, the first bearing ring projection 20 is disposeable within the first bearing opening 1a and the first backing ring projection 22 is disposeable within the first backing ring opening 2a, so as to thereby couple the first bearing inner ring 1 and the first backing ring 2. When coupled, an axial end 1c of the first bearing ring 1 and an axial end 2c of the first backing ring 2 are maintained in abutting contact.

Alternatively, in the second orientation $O_2$, the second circumferential surface 16 is an outer circumferential surface, the second bearing ring projection 24 is disposeable within the second bearing opening 3a and the second backing ring projection 26 is disposeable within the second backing ring opening 4a so as to thereby couple the second bearing ring 3 and the second backing ring 4. As with the first bearing assembly 5, an axial end 3c of the second bearing ring 3 and an axial end 4c of the second backing ring 4 are maintained in abutting contact when the second bearing ring 3 is coupled with the second backing ring 4. Thus, a single coupler 10 is utilizable to connect or couple two different types of railway axle bearing assemblies 5 and 6, such as two different commercially available products manufactured by two separate business entities.

Figure 15:
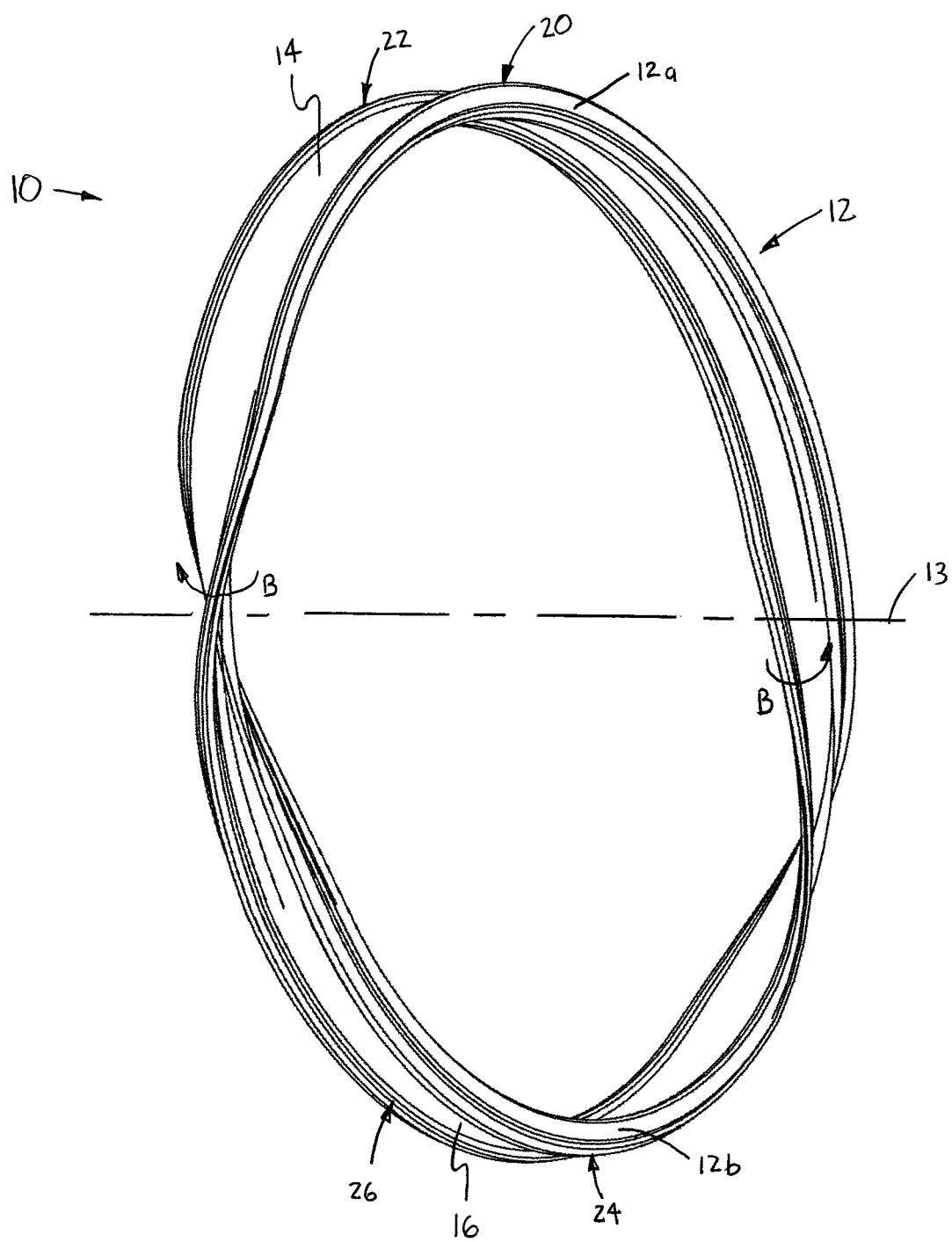
FIG. 15 is a perspective view of the coupler during a process of inverting between the first orientation and the second orientation

Referring to FIGS. 15-17, when separate from each of the bearing assemblies 5, 6, the coupler 10 is configured to invert between the first and second orientations $O_1$ and $O_2$ by bending the annular body 12 about itself. Specifically, the annular body 12 is bended such that one of the first axial ends 12a or 12b displaces radially inwardly and then radially outwardly while the other one of the first and second axial ends 12b, 12a displaces radially outwardly and then radially inwardly until one of the first and second circumferential surfaces 14 or 16 moves from an outwardly-facing position to an inwardly-facing position and the other one of the first and second circumferential surfaces 16, 14 moves from an inwardly-facing position to an outwardly-facing position. Typically, the coupler 10 is inverted between the two orientations $O_1$, $O_2$ by manually bending any portion of the body 12 and then progressively bending portions of the body 12 circumferentially adjacent to the initial body portion until the entire body 12 is inverted, as indicated by arrows B in FIGS. 15-17. Further, the annular body 12 is freely invertible between the two orientations $O_1$, $O_2$ as necessary for use in a particular axle assembly 5 or 6 whenever the coupler 12 is separate from the assemblies 5, 6.

Referring now to FIGS. 10, 11, 13 and 14, each one of the bearing projections 20, 24 and each one of the backing ring projections 22, 26 has a base end 20a, 24a and 22a, 26a, respectively, which is preferably integrally formed with the coupler annular body 12, and a free end 20b, 24b and 22b, 26b, respectively, spaced radially from the associated base end 20a, 24a, 22a, 26a. Each first projection 20, 22 also has an inner axial end 20c, 22c facing the inner axial end 22c, 20c of the other projection 22, 20 and an opposing outer axial end 20d, 22d. Likewise, each second projection 24, 26 has an inner axial end 24c, 26c facing the inner axial end 26c, 24c of the other projection 26, 24 and an opposing outer axial end 24d, 26d. Further, each bearing projection 20, 24 and each backing ring projection 22, 26, has both an axial width $AW_{20}$, $AW_{24}$ (FIG. 11) and $AW_{22}$, $AW_{26}$ (FIG. 14), respectively, and a radial length $RL_{20}$, $RL_{24}$ (FIG. 11) and $RL_{22}$, $RL_{26}$ (FIG. 14), respectively.

Figure 10:
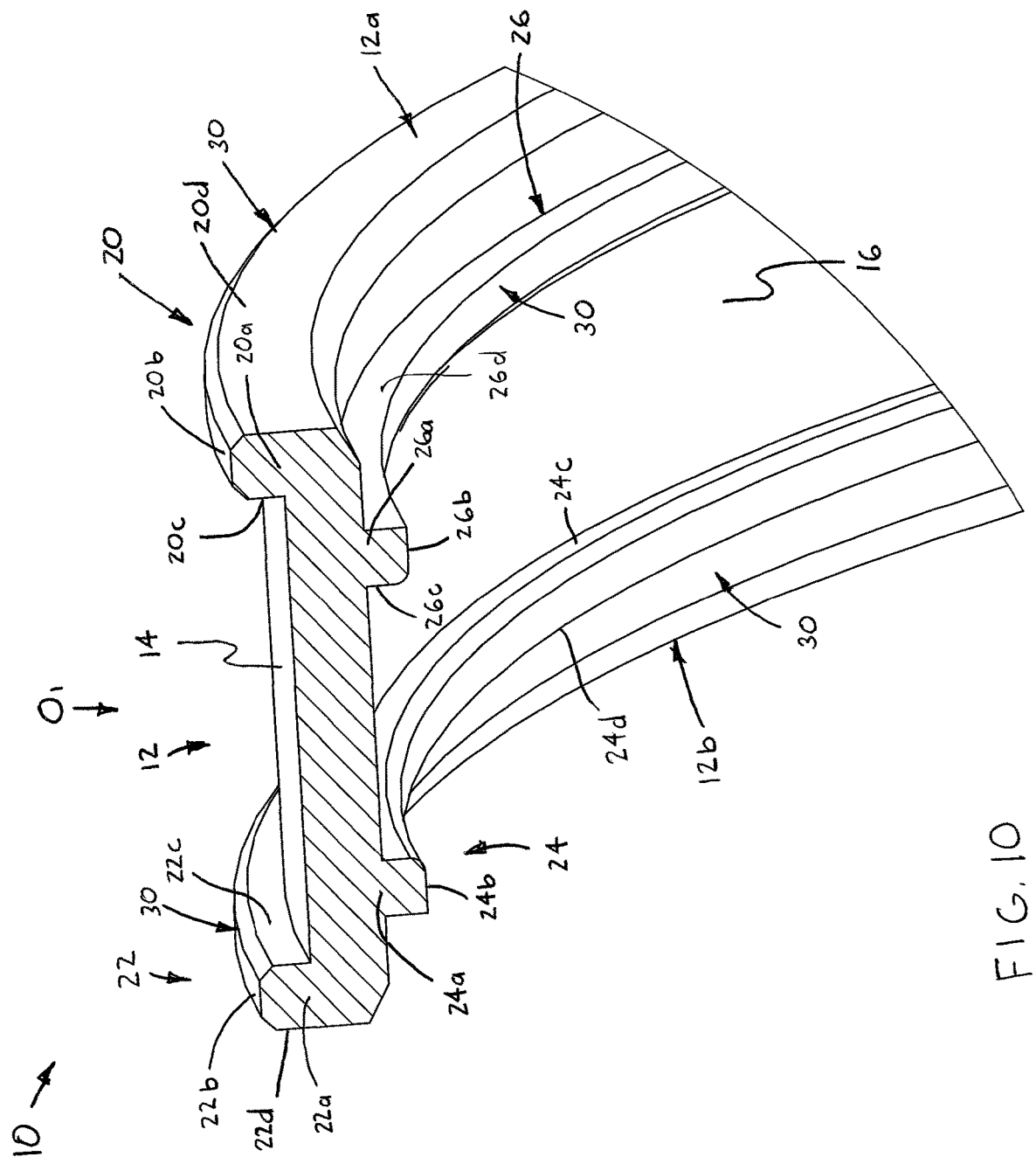
FIG. 10 is a broken-away view of a portion of FIG. 9 in partial axial cross-section.
Figure 11:
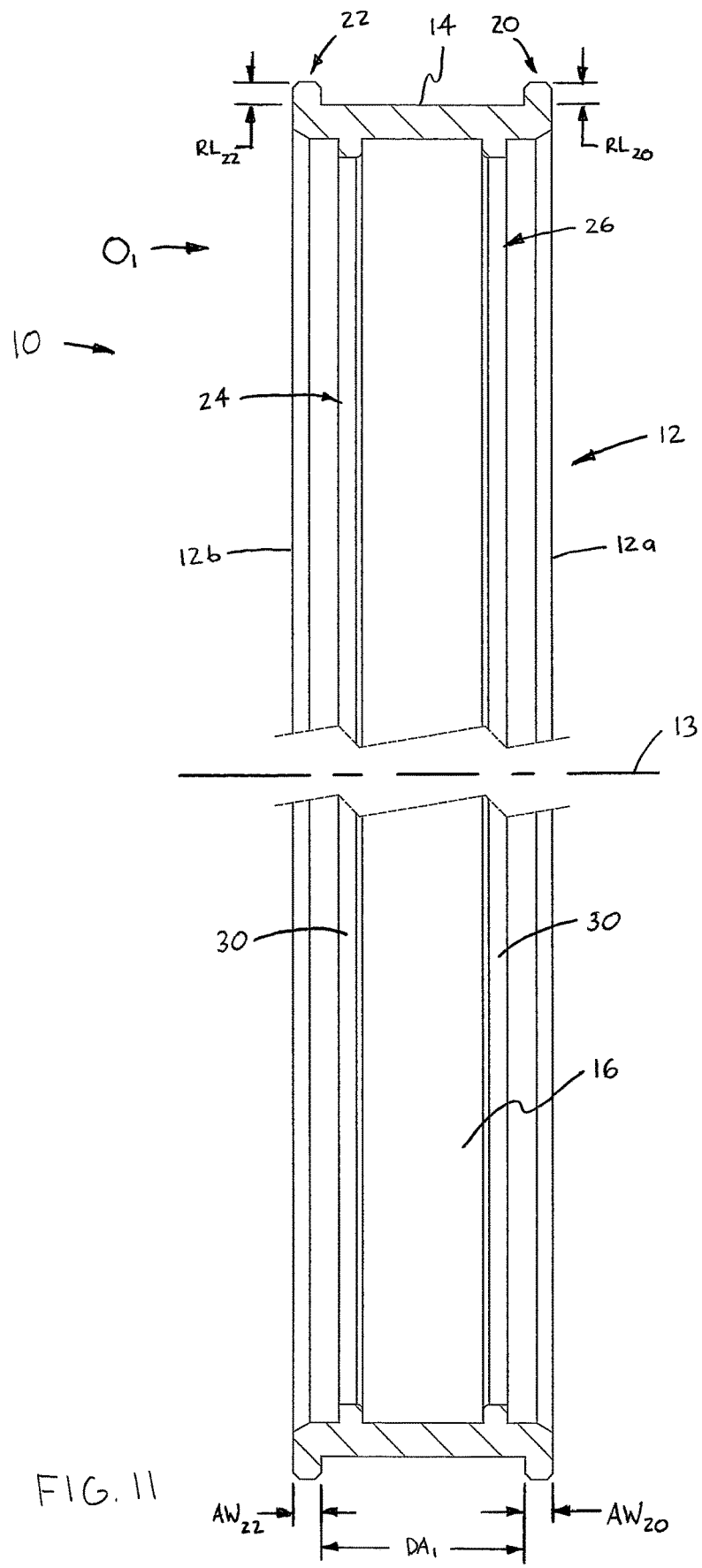
FIG. 11 is a broken-away, axial cross-sectional view of the coupler in the first orientation.
Figure 12:
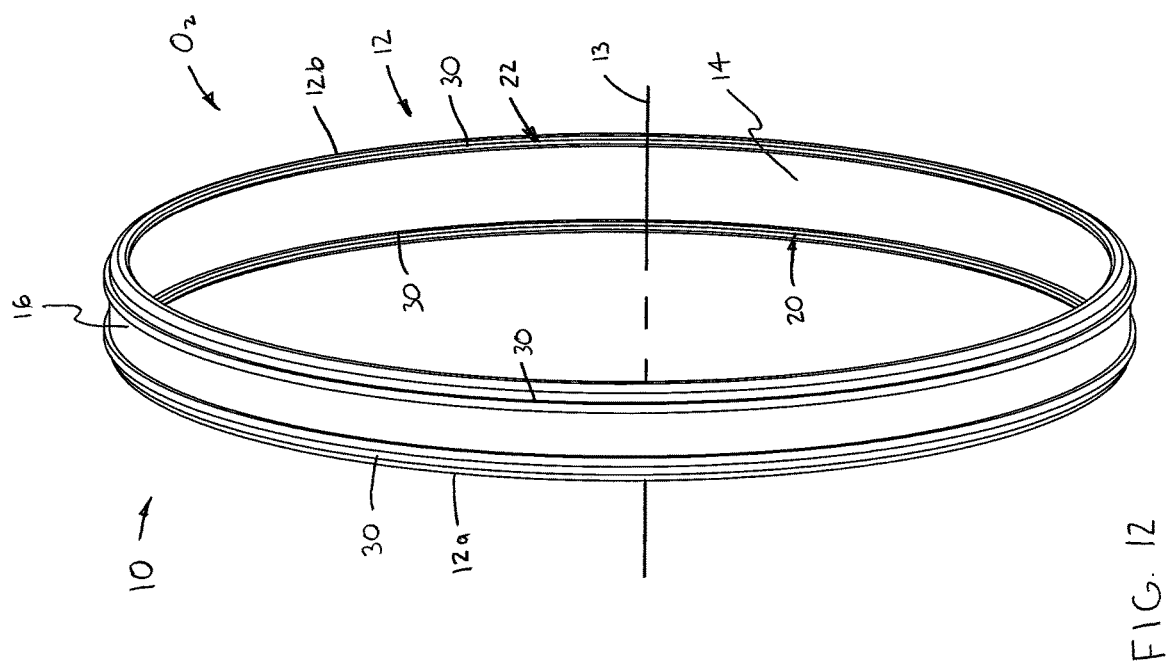
FIG. 12 is a perspective view of the coupler in the second orientation.
Figure 13:
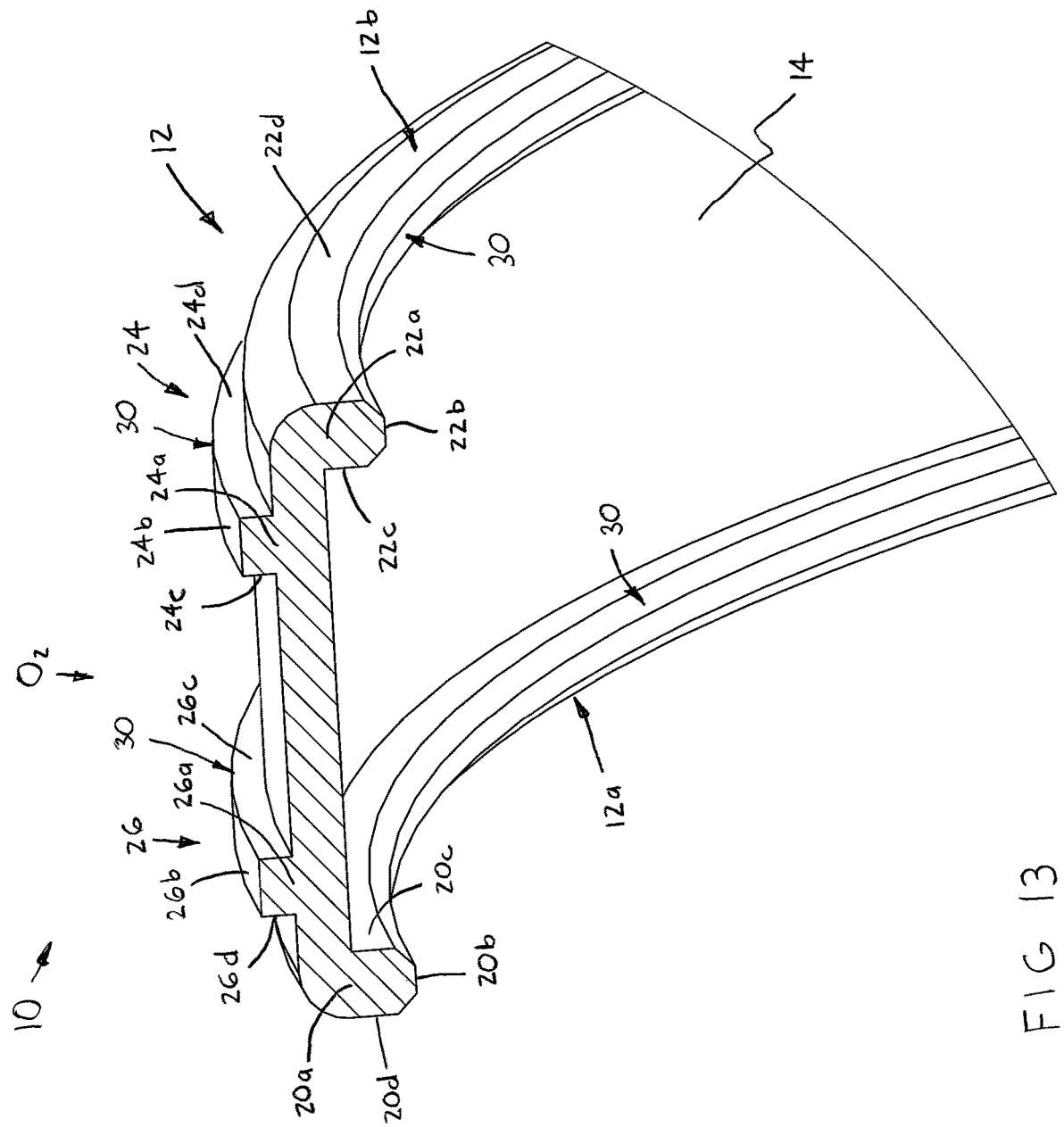
FIG. 13 is a broken-away view of a portion of FIG. 12 in partial axial cross-section.
Figure 14:
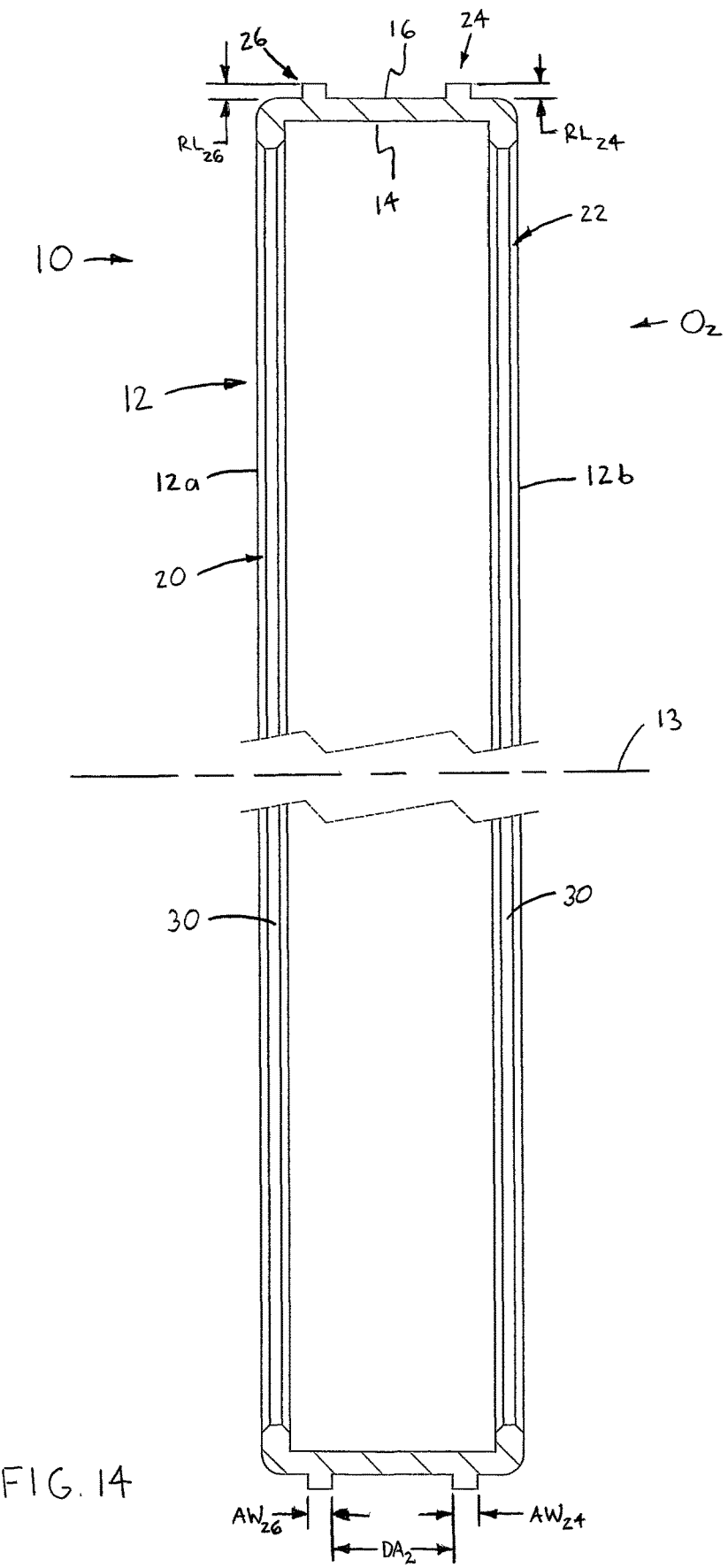
FIG. 14 is a broken-away, axial cross-sectional view of the coupler in the second orientation.
Figure 18A:
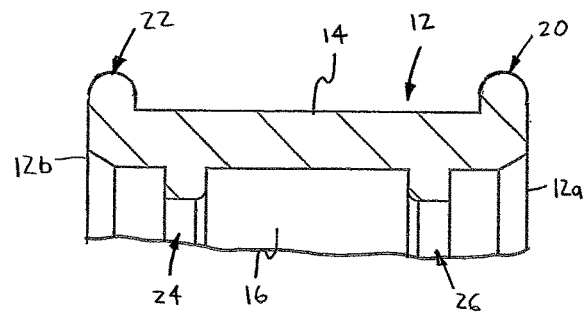
FIGS. 18A-18F, collectively
Figure 18B:
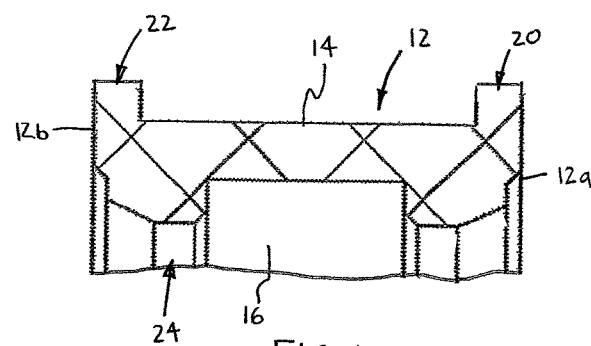
Figure 18C:
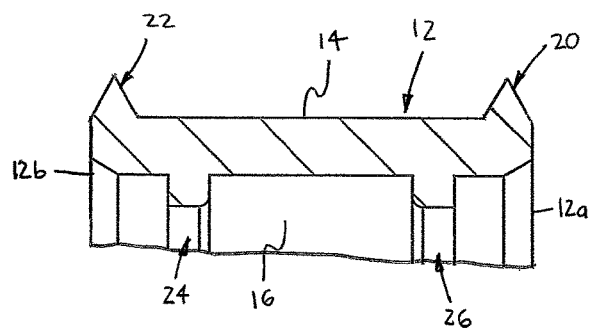
Figure 18D:
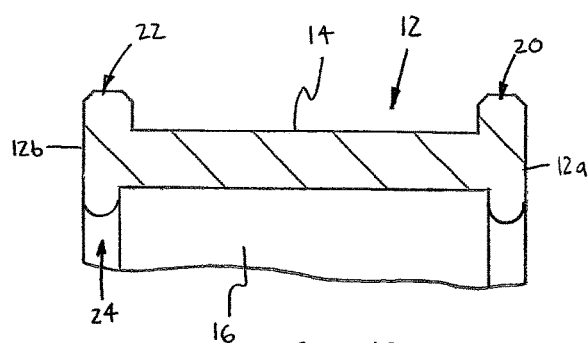
Figure 18E:
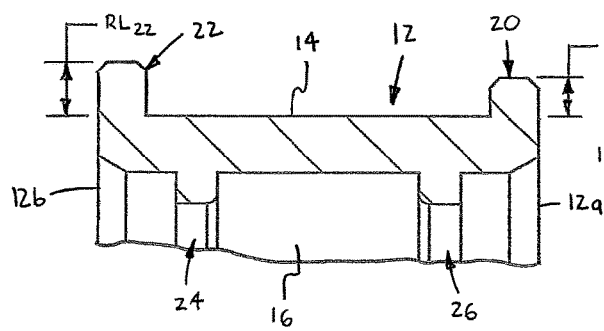

Referring to FIGS. 10, 13 and 18, the free end 20b, 24b of each bearing projection 20, 24 and the free end 22b, 26b of each backing ring projection 22, 26 further has an axial cross-sectional shape (i.e., shape of cross-sections taken along centerline) that may be generally rectangular, generally triangular (FIG. 18C), another polygonal shape (e.g., partially hexagonal, partially octagonal, etc.), ramp-shaped (FIG. 18B) or generally curved (e.g., semi-circular) (FIGS. 18A, 18D). The first projections 20, 22 and the second projections 24, 26 may have any combination of axial cross-sectional shapes, as discussed in further detail below.

Figure 18F:
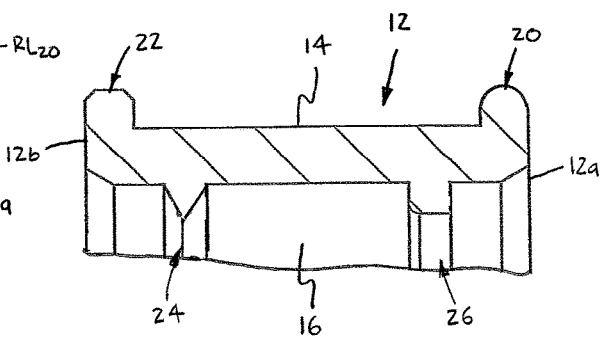

Preferably, the two first projections 20, 22 each have a first, partially hexagonal axial cross-sectional shape and the two second projections 24, 26 each have a second, generally rectangular axial cross-sectional shape, as best shown in FIGS. 10, 11, 13 and 14. Alternatively, each bearing projection 20, 24 may have the same, first shape (e.g., rectangular) and each backing ring projection 22, 26 may have the same, second shape (e.g., generally curved) (structure not shown). As further alternatives, all four projections 20, 22, 24, 26 may have the same axial cross-sectional shape (not shown) or each projection 20, 22, 24, 26 may have a shape that is different than the shape of the three other projections 20, 22, 24, 26 (FIG. 18F). In any case, the cross-sectional shapes of each projection 20, 22, 24 and 26 is preferably selected to optimize engagement with the axial cross-sectional profile of the mating annular opening(s) 1a, 2a, 3a and 4a, respectively.

Preferably, the annular body 12 is formed of a polymeric material, most preferably polyurethane but may also be formed of a thermoplastic elastomer or similar polymers, or may alternatively be formed of any other appropriate material. As each projection 20, 22, 24, 26 is preferably integrally formed with the coupler body 12, the four projections 20, 22, 24 and 26 are also formed of the same material as the body 12. Although not preferred, the four projections 20, 22, 24, 26 may alternatively be formed separately from the annular body 12, and thereafter attached to the body 12 by any appropriate means, such that the projections 20, 22, 24, 26 may be formed of a material different than the body 12, e.g., a different polymeric material or other sufficiently flexible material.

Figure 19:
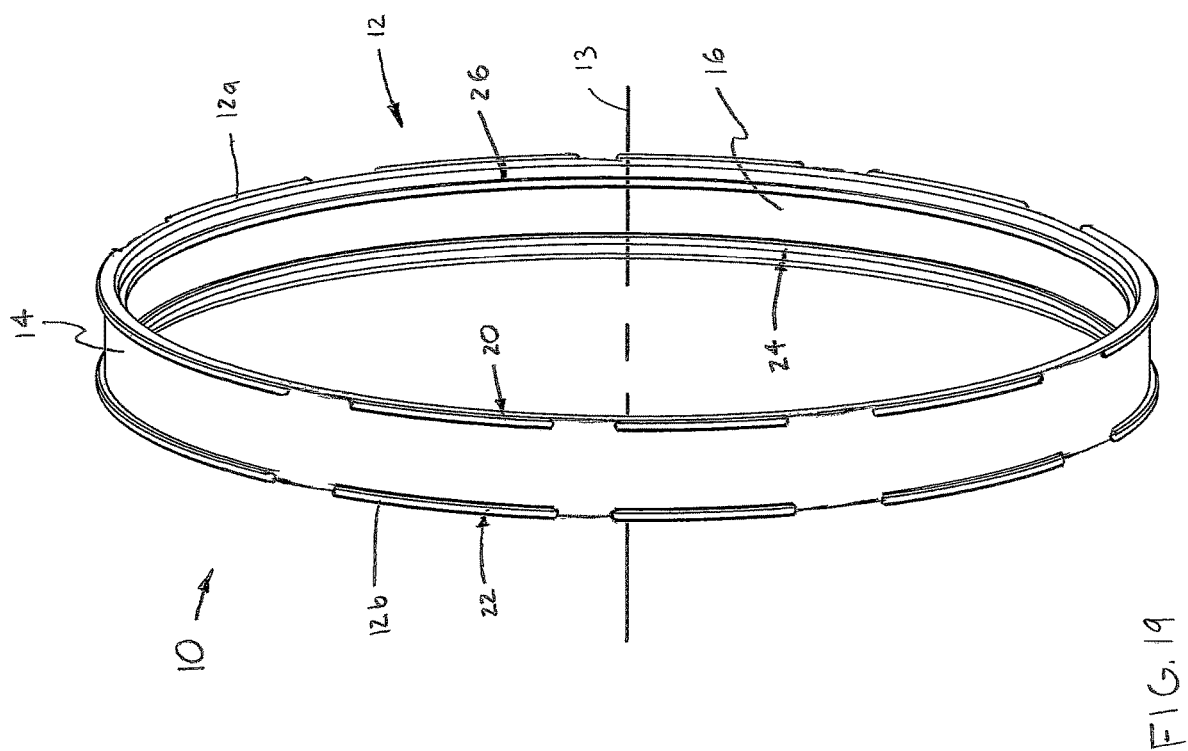
FIG. 19 is a perspective view of an alternative coupler having projections formed of a plurality of arcuate segments.

Referring to FIGS. 9-14, each one of the bearing projections 20, 24 and each one of the backing ring projections 22, 26 preferably includes, or is formed as, a generally annular shoulder 30 extending radially from either the first circumferential surface 14 or the second circumferential surface 16, and circumferentially about the coupler body centerline 13. Alternatively, any one or more of the projections 20, 22, 24 or/and 26 may include a plurality of arcuate segments 32 each extending radially from the first or second circumferential surface 14, 16 and spaced apart circumferentially about the body centerline 13, as depicted in FIG. 19. Thus, all four of the coupler projections 20, 22, 24 and 26 may be formed as annular shoulders 30 or as a plurality of arcuate segments 32 or the coupler 10 may include any combination of shoulders 30 and arcuate segments 32. For example, each first projection 20, 22 may include arcuate segments 32 and each second projection 24, 26 may include annular shoulders 30, as shown in FIG. 19.

The structural differences between the four projections 20, 22, 24 and 26, as discussed above and in further detail below, are determined by the particular structure of the bearing rings 1, 3 and the backing rings 2, 4 of the different axle assemblies 5, 6. Specifically, the location, size (width and/or depth), axial cross-sectional profile and/or circumferential shape (continuous groove or arcuate segment) of the bearing ring openings 1a, 3a, and the backing ring openings 2a, 4a dictates the particular form of the coupler projections 20, 22, 24, 26.

Referring to FIGS. 4, 5, 7, 8, 11 and 14, the first axial distance $D_{A1}$ between the first bearing projection 20 and the first backing ring projection 22 is preferably greater than the second axial distance $D_{A2}$ between the second bearing projection 24 and the second bearing projection 26, as indicated in FIGS. 4, 6, 11 and 14. However, the coupler 10 may alternatively be formed such that the first axial distance $D_{A1}$ between the first projections 20, 22 is lesser than the second axial distance $D_{A2}$ between the second projections 24, 26 (not shown). The difference in the axial distances $D_{A1}$, $D_{A2}$ correlates with the difference in the spacing distance OS (FIG. 5) between the openings 1a, 2a of the first axle bearing assembly 5 and the spacing distance $OS_2$ (FIG. 8) between the openings 3a, 4a of the second axle bearing assembly 6. However, the axial distance $D_{A1}$ between the first projections 20, 22 may be substantially equal to axial distance $D_{A2}$ between the second projections 24, 26, such as when the spacing distance $OS_1$, $OS_2$ between the openings 1a, 2a and 3a, 4a, respectively, are substantially equal (not shown), but with openings 1a, 2a and 3a, 4a which vary in axial width, depth, etc.

When the opening spacing distance $OS_1$ in the first bearing assembly 5 is greater than the opening spacing distance $OS_2$ in the second bearing assembly 6, as depicted in FIGS. 1-8, the coupler 10 is preferably formed such that the outer axial end 20d of the first bearing ring projection 20 and the outer axial end 22d of first backing ring projection 22 are each disposed at a separate one of the coupler body first and second axial ends 12a, 12b, respectively. Further, the outer axial end 24d of the second bearing ring projection 24 and the outer axial end 26d of the second backing ring projection 26 are spaced axially inwardly from the coupler body axial ends 12b, 12a, respectively. However, the outer axial ends 24d, 26d of the second projections 24, 26 may be disposed at the coupler body axial ends 12b, 12a, respectively, and the outer axial ends 20d, 22d of the first projections 20, 22 may be spaced inwardly from the body ends 12a, 12b, when the opening spacing distance $OS_2$ in the second bearing assembly 6 is greater than the opening spacing distance $OS_1$ in the first bearing assembly 5. As a further alternative, the coupler 10 may be formed such that both of the first projections 20, 22 and both of the second projections 24, 26 are spaced axially inwardly from the body axial ends 12a, 12b.

Referring now to FIGS. 5, 8, 11 and 14, when there are differences between the axial widths $OW_1$, $OW_2$, $OW_3$, $OW_4$ of the openings 1a, 2a, 3a, 4a of the two axle bearing assemblies 5, 6, the projections 20, 22, 24, 26 are preferably formed with different axial widths $AW_{20}$, $AW_{24}$, $AW_{22}$, $AW_{26}$. More specifically, when the first bearing opening 1a has a greater axial width $OW_1$ than the second bearing opening axial width $OW_3$, the axial width $AW_{20}$ of the first bearing ring projection 20 is preferably greater than the axial width $AW_{24}$ of the second bearing ring projection 24. Alternatively, when the first bearing opening 1a has a lesser axial width $OW_1$ than the second bearing opening axial width $OW_3$, the first bearing projection axial width $AW_{20}$ is preferably lesser than the second bearing projection axial width $AW_{24}$.

Likewise, when the first backing ring opening 2a has a greater axial width $OW_2$ than the second backing ring opening axial width $OW_4$, the axial width $AW_{22}$ of the first backing ring projection 22 is preferably greater than the axial width $AW_{26}$ of the second backing ring projection 26. And when the first backing ring opening 2a has a lesser axial width $OW_2$ than the axial width $OW_4$ of the second backing ring opening 4a, the axial width $AW_{22}$ of the first backing ring projection 22 is preferably lesser than the axial width $AW_{26}$ of the second backing ring projection 26. However, the coupler 10 may be formed having all four projections 20, 22, 24, and 26 of substantially equal axial widths $AW_{20}$, $AW_{22}$, $AW_{24}$, $AW_{26}$. Further, either one of the first projections 20, 22 or/and either one of the second projections 24, 26 may have an axial width $AW_{20}$, $AW_{22}$ or/and $AW_{24}$, $AW_{26}$ that is greater or lesser than the radial length $AW_{22}$, $AW_{20}$ or/and $AW_{26}$, $AW_{24}$ of the other projection 22, 20 or/and 26, 24.

Still referring to FIGS. 5, 8, 11 and 14, when the "depths" or radial lengths $OR_1$, $OR_2$, $OR_3$, $OR_4$ of the ring openings 1a, 2a, 3a and 4a, respectively, vary between the two axle bearing assemblies 5, 6, respectively, the projections 20, 22, 24, 26 may be formed with different radial lengths $RL_{20}$, $RL_{22}$, $RL_{24}$ and $RL_{26}$, respectively. More specifically, when the first bearing opening 1a has a greater radial length $OR_1$ than the radial length $OR_3$ of the second bearing opening 3a, the radial length $RL_{20}$ of the first bearing projection 20 is greater than the radial length $RL_{24}$ of the second bearing projection 24. Alternatively, when the first bearing opening 1a has a radial length $OR_1$ that is lesser than radial length $OR_3$ of the second bearing opening 3a, the first bearing projection radial length $RL_{20}$ is lesser than the second bearing projection radial length $RL_{24}$.

Likewise, when the first backing ring opening 2a has a radial length $OR_2$ that is greater than the radial length $OR_4$ of the second backing ring opening 4a, the first backing ring projection 22 has a radial length axial $RL_{22}$ that is greater than the radial length $RL_{26}$ of the second backing ring projection 26. And alternatively, when the first backing ring opening 2a has a radial length $OR_2$ that is lesser than the radial length $OR_4$ of the second backing ring opening 4a, the first backing ring projection radial length $RL_{22}$ is lesser than the second backing ring projection radial length $RL_{26}$. However, the coupler 10 may be formed having all four projections 20, 22, 24, and 26 of substantially equal radial lengths $RL_{20}$, $RL_{22}$, $RL_{24}$, $RL_{26}$. Alternatively, either one of the first projections 20, 22 or/and either one of the second projections 24, 26 may have a radial length $RL_{20}$, $RL_{22}$ or/and $RL_{24}$, $RL_{26}$ that is greater or lesser than the radial length $RL_{22}$, $RL_{20}$ or/and $RL_{26}$, $RL_{24}$ of the other projection 22, 20 or/and 26, 24, and depicted for the first projections 20, 22 in FIG. 18E.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A coupler for selectively coupling either a first bearing ring with a first backing ring or a second bearing ring with a second backing ring, each one of the bearing rings and each one of the backing rings having at least one opening on an inner circumferential surface, the coupler comprising:
   an annular body formed of a flexible material, sized to be disposable simultaneously within the first bearing ring and the first backing ring or within the second bearing ring and the second backing ring, and having a centerline, first and second axial ends and opposing first and second circumferential surfaces;
   a first bearing projection and a first backing ring projection each extending radially from the body first circumferential surface and spaced apart axially along the centerline; and
   a second bearing projection and a second backing ring projection each extending radially from the body second circumferential surface and spaced apart axially along the centerline;
   wherein the annular body is configured to be invertible between:
      a first orientation in which the first circumferential surface is an outer circumferential surface, the first bearing ring projection is disposable within the first bearing opening and the first backing ring projection is disposable within the first backing ring opening so as to couple the first bearing ring and the first backing ring; and
      a second orientation in which the second circumferential surface is an outer circumferential surface, the second bearing ring projection is disposable within the second bearing opening and the second backing ring projection is disposable within the second backing ring opening so as to couple the second bearing ring and the second backing ring.

2. The coupler as recited in claim 1 wherein:
   at least one of the first bearing projection and the first backing ring projection includes a generally annular shoulder extending radially from the first circumferential surface and circumferentially about the centerline or a plurality of arcuate segments each extending radially from the first circumferential surface and spaced apart circumferentially about the centerline; and
   at least one of the second bearing projection and the second backing ring projection includes a generally annular shoulder extending radially from the second circumferential surface and circumferentially about the centerline or a plurality of arcuate segments each extending radially from the second circumferential surface and spaced apart circumferentially about the centerline.

3. The coupler as recited in claim 1 wherein the first bearing projection and the first backing ring projection are spaced apart by a first axial distance, the second bearing projection and the second backing ring projection are spaced apart by a second axial distance, the first axial distance being greater than or lesser than the second axial distance.

4. The coupler as recited in claim 3 wherein:
   each one of the first bearing projection, the first backing ring projection, the second bearing projection and the second backing ring projection has an outer axial end; and
   the first bearing ring projection outer axial end and the first backing ring projection outer axial end are disposed at a separate one of the annular body first and second axial ends or the second bearing ring projection outer axial end and the second backing ring projection outer axial end are disposed at a separate one of the annular body first and second axial ends.

5. The coupler as recited in claim 3 wherein at least one of:
   the first bearing projection has an axial width, the second bearing projection has an axial width, the first bearing projection axial width being greater than or lesser than the second bearing projection axial width; and
   the first backing ring projection has an axial width, the second backing ring projection has an axial width, the first backing ring projection axial width being greater than or lesser than the second backing ring projection axial width.

6. The coupler as recited in claim 3 wherein at least one of:
   the first bearing projection has a radial length, the second bearing projection has a radial length, the first bearing projection radial length being greater than or lesser than the second bearing projection radial length; and
   the first backing ring projection has a radial length, the second backing ring projection has a radial length, the first backing ring projection radial length being greater than or lesser than the second backing ring projection radial length.

7. The coupler as recited in claim 3 wherein:
   each one of the first bearing projection, the first backing ring projection, the second bearing projection and the second backing ring projection has a radial end integrally formed with a remainder of the annular body and an opposing free radial end; and the free radial end of each one of the first bearing projection and the first backing ring projection has an axial cross-sectional shape being one of triangular, rectangular, another polygonal profile and generally curved and the free end of each one of the second bearing projection and the second backing ring projection has an axial cross-sectional shape being another one of triangular, rectangular, another polygonal profile and generally curved.

8. The coupler as recited in claim 1 wherein the annular body is formed of polyurethane or a thermoplastic elastomer.

9. The coupler as recited in claim 1 wherein the annular body is configured to invert between the first and second orientations by bending the annular body such that one of the first axial ends displaces radially inwardly and then radially outwardly while the other one of the first and second axial ends displaces radially outwardly and then radially inwardly until one of the first and second circumferential surfaces moves from an outwardly facing position to an inwardly facing position and the other one of the first and second circumferential surfaces moves from an inwardly facing position to an outwardly facing position.

\* \* \* \* \*